(12) United States Patent
Zhou et al.

(10) Patent No.: US 7,989,549 B2
(45) Date of Patent: Aug. 2, 2011

(54) POLYMER COMPOSITIONS AND METHOD OF MAKING PIPES

(75) Inventors: Zhiqiang Jimmy Zhou, Somerset, NJ (US); William J. Michie, Jr., Missouri City, TX (US)

(73) Assignee: Union Carbide Chemicals & Plastics Technology LLC, Wilmington, DE (US)

( * ) Notice: Subject to any disclaimer, the term of this patent is extended or adjusted under 35 U.S.C. 154(b) by 0 days.

(21) Appl. No.: 11/202,756

(22) Filed: Aug. 12, 2005

(65) Prior Publication Data

US 2006/0041073 A1 Feb. 23, 2006

Related U.S. Application Data

(63) Continuation of application No. 10/454,049, filed on Jun. 4, 2003, now abandoned.

(60) Provisional application No. 60/386,291, filed on Jun. 4, 2002.

(51) Int. Cl.
*C08L 23/00* (2006.01)
*C08L 23/04* (2006.01)

(52) U.S. Cl. .................................. 525/191; 525/240

(58) Field of Classification Search .................. 525/191, 525/240

See application file for complete search history.

(56) References Cited

U.S. PATENT DOCUMENTS

| | | | |
|---|---|---|---|
| 3,984,610 A | 10/1976 | Elston | |
| 4,461,873 A * | 7/1984 | Bailey et al. | 525/240 |
| 4,500,648 A | 2/1985 | Malpass | |
| 4,530,914 A | 7/1985 | Ewen et al. | |
| 4,752,597 A | 6/1988 | Turner | |
| 4,851,489 A | 7/1989 | Malpass | |
| 4,935,474 A | 6/1990 | Ewen et al. | |
| 4,937,299 A | 6/1990 | Ewen et al. | |
| 5,047,485 A | 9/1991 | DeNicola, Jr. | |
| 5,055,438 A | 10/1991 | Canich | |
| 5,057,475 A | 10/1991 | Canich et al. | |
| 5,064,802 A | 11/1991 | Stevens et al. | |
| 5,096,867 A | 3/1992 | Canich | |
| 5,132,380 A | 7/1992 | Stevens et al. | |
| 5,272,236 A | 12/1993 | Lai et al. | |
| 5,324,800 A | 6/1994 | Welborn, Jr. et al. | |
| 5,380,803 A * | 1/1995 | Coutant et al. | 525/240 |
| 5,470,811 A | 11/1995 | Jejelowo et al. | |
| 5,530,072 A | 6/1996 | Shirodkar | |
| 5,556,928 A | 9/1996 | Devore et al. | |
| 5,665,800 A | 9/1997 | Lai et al. | |
| 5,685,128 A | 11/1997 | Chum et al. | |
| 5,703,180 A | 12/1997 | Tsutsui et al. | |
| 5,703,187 A | 12/1997 | Timmers | |
| 5,783,638 A | 7/1998 | Lai et al. | |
| 5,852,152 A | 12/1998 | Walton et al. | |
| 5,965,756 A | 10/1999 | McAdon et al. | |
| 6,001,941 A | 12/1999 | Tsutsui et al. | |
| 6,015,868 A | 1/2000 | Nicklas et al. | |
| 6,034,021 A | 3/2000 | Wilson et al. | |
| 6,107,147 A | 8/2000 | Kim et al. | |
| 6,114,457 A | 9/2000 | Markel et al. | |
| 6,114,486 A | 9/2000 | Rowland et al. | |
| 6,143,854 A | 11/2000 | Bamberger et al. | |
| 6,147,180 A | 11/2000 | Markel et al. | |
| 6,197,910 B1 | 3/2001 | Weng et al. | |
| 6,207,606 B1 | 3/2001 | Lue et al. | |
| 6,277,931 B1 | 8/2001 | Jaber et al. | |
| 6,346,575 B1 | 2/2002 | Debras et al. | |
| 6,369,176 B1 | 4/2002 | Laughner et al. | |
| 6,462,135 B1 * | 10/2002 | Rohde et al. | 525/191 |
| 6,545,093 B1 * | 4/2003 | de Lange et al. | 525/191 |
| 6,787,608 B2 * | 9/2004 | VanDun et al. | 525/240 |
| 2001/0039320 A1 | 11/2001 | Jacobsen et al. | |

FOREIGN PATENT DOCUMENTS

| | | |
|---|---|---|
| EP | 0 321 964 A2 | 6/1989 |
| EP | 0 773 257 A2 | 5/1997 |
| EP | 0 778 289 A1 | 6/1997 |
| EP | 1 057 834 A1 | 12/2000 |
| WO | WO-96/07478 A | 3/1996 |
| WO | WO 97/48735 A | 12/1997 |
| WO | WO-00/49059 A | 8/2000 |
| WO | WO-00/50488 A | 8/2000 |
| WO | WO-01/14434 A | 3/2001 |
| WO | WO-01-42315 A | 6/2001 |
| WO | WO-01/92403 A2 | 12/2001 |
| WO | WO-03/016396 A1 | 2/2003 |

OTHER PUBLICATIONS

F. Chen, et al., *Crystallisation of single-site polyethylene blends investigated by thermal fractionation techniques*, Polymer 42, 2001, pp. 4579-4587, Australia.

Satoru Hosoda, et al. *Degree of comonomer Inclusion into lamella crystal for propylene/olefin copolymers*, Polymer 43, 2002, pp. 7451-7460, Australia.

* cited by examiner

*Primary Examiner* — Nathan M Nutter

(57) ABSTRACT

A polymer composition comprises a low-molecular-weight (LMW) ethylene polymer component and a high-molecular-weight (HMW) ethylene polymer component. Preferably, the LMW polyethylene component and the HMW polyethylene component co-crystallize in the composition such that it exhibits a single or substantially single peak in a lamella thickness distribution ("LTD") curve. The ethylene polymer for the LMW and the HMW polyethylene components can be either homopolyethylene or ethylene copolymer. Preferably, both components are an ethylene copolymer of the same or different composition (i.e., with the same or different comonomers). A method of making a pipe that includes selecting a polymer composition having a substantially single peak in the LTD curve is described.

9 Claims, 3 Drawing Sheets

POLYMER COMPOSITIONS AND METHOD OF MAKING PIPES

PRIOR RELATED APPLICATIONS

This patent application is a continuation of U.S. application Ser. No. 10/454,049 filed Jun. 4, 2003 now abandoned, and claims priority to U.S. Provisional Application Ser. No. 60/386,291, filed on Jun. 4, 2002, the disclosures of which are incorporated by reference in their entirety herein.

FEDERALLY SPONSORED RESEARCH STATEMENT

Not applicable.

REFERENCE TO MICROFICHE APPENDIX

Not applicable.

FIELD OF THE INVENTION

The invention relates to polymer compositions for pipes and methods of making the compositions.

BACKGROUND OF THE INVENTION

Polyethylene pipes are light in weight, easy to handle, and are non-corrosive. In addition, their rigidity is relatively high that they can be laid under the ground, and their flexibility is also relatively high that they can follow a movement of ground. Due to these advantageous characteristics, the amount of polyethylene pipes used is rapidly increasing in recent years.

In addition to the above desirable characteristics, polyethylene pipes should have (1) impact resistance sufficient to endure impacts given at the time when and after they are set; and (2) excellent long-term durability under gas or water pressure (specifically, environmental stress cracking resistance and internal pressure creep resistance).

With respect to the long-term durability, conventional pipes made from HDPE meets the ISO standard, i.e. 50-year durability at normal temperatures under an internal pressure, expressed in terms of circumferential stress, of approximately 8 MPa. However, these conventional polyethylene pipes are still insufficient in the long-term durability for use under more sever conditions, such as main pipes for gases or running water which have a large diameter and undergo high internal pressure. For this reason, they are presently used mainly for branch pipes and the like, having a small diameter.

The long-term durability of a polyethylene pipe in the field is considered to be determined by its resistance to slow crack growth, that is the resistance to cracking which is caused when an internal pressure applied to the pipe acts as a tensile stress in the circumferential direction on the pipe over a long period of time. Therefore, in order to improve the long-term durability of polyethylene pipes, it is necessary to improve a pipe's slow crack growth resistance as well as its resistance to rapid crack propagation.

For plastic pipe applications, circumferential (hoop) stress performance as set forth in ISO 1167 and ISO 9080 is an important requirement. These procedures describe the long-term creep rupture behavior of plastic materials by an extrapolation methodology wherein the hydrostatic strength of pipe materials for 50 years at 20° C. are predicted. Typically, for long term predictive performance testing, candidate pipe materials are placed at various stresses and the lifetime at a given temperature is determined. For extrapolations to 50 years at 20° C., testing is also performed at two higher temperatures, commonly 60° C. and 80° C. The measured lifetime curves at each temperature display ductile mode failure for the extrapolation to be valid. While lower stress, longer lifetime brittle mode failures occur, the brittle failure mode is not used for the extrapolation procedure. The ductile failure mode is referred to as Stage I failure and conversely the brittle failure mode is referred to as Stage II failure.

First and second generation polyethylene pipes for water and gas distribution have minimum required strength (MRS) ratings for respective hoop stresses of 6.3 and 8 MPa and are known as PE63 and PE80, respectively. Third generation polyethylene pipes, which are known as PE100 pipes, conform to a MRS rating of 10. The MRS rating is based on the above ISO procedures wherein a MRS rating of 10 specifies that pipes made from the polyethylene materials must withstand 10 MPa at 20° C. for 50 years at the 97.5 lower confidence level of the four parameter extrapolation curve.

Another important pipe or durable material performance requirement is resistance to rapid crack propagation (RCP). The RCP of a pipe material is typically measured by testing extruded pipe in accordance with ISO 13477 (the so-called 'S4' test). Various small scale tests have been introduced in the plastic pipe industry to provide a measure of a polymer pipe's resistance to rapid crack propagation. Small scale tests include the inverted Charpy test and the Plane High-Speed Double Torsion test as well as ranking tests such as a critical strain energy release rate test or $G_c$ measurement on compression molded materials. A lower ductile to brittle transition temperature, $T_{db}$, of a material is also indicative of its resistance to rapid crack propagation.

Although numerous pipe compositions have been known and used, there continues to exist a need for improved durable materials, especially for transmission and distribution pipe service for gases and water. Preferably, the materials should exhibit improved durability and higher temperature service lives. In particular, there is still a need for high density polyethylene durable materials with better resistance to slow crack growth and rapid crack propagation while maintaining an ISO MRS 10 rating.

SUMMARY OF THE INVENTION

Embodiments of the invention address one or more of the needs described above by providing a polymer composition that includes a LMW polyethylene component and a HMW polyethylene component. The composition has a substantially single peak in an LTD curve and a PENT value of greater than about 1000 hours at about 2.4 MPa. Some polymer compositions have a PENT value of greater than about 6000 hours at about 3 MPa to about 6500 hours or more at about 3 MaP.

Embodiments of the invention also provide a method of making a polymer having a substantially single peak in its LTD curve. In a preferred embodiment, the method is a dual reactor process. Preferably, the HMW component is made in the first reactor and the LMW is made in the second reactor. In some embodiments, methods of making the polymer composition include melt blending of a HMW polyethylene and a LMW polyethylene and single reactor processes using mixed catalysts or single catalysts capable of making a composition having a LMW component and a HMW component.

Other embodiments provide methods of making pipes from the polymer compositions. The methods include selecting a polymer composition with a substantially singular peak in its LTD curve and extruding the polymer composition to form a pipe. Some methods may also include the methods of making the polymer compositions described herein.

DESCRIPTION OF EMBODIMENTS OF THE INVENTION

Figure 1A:
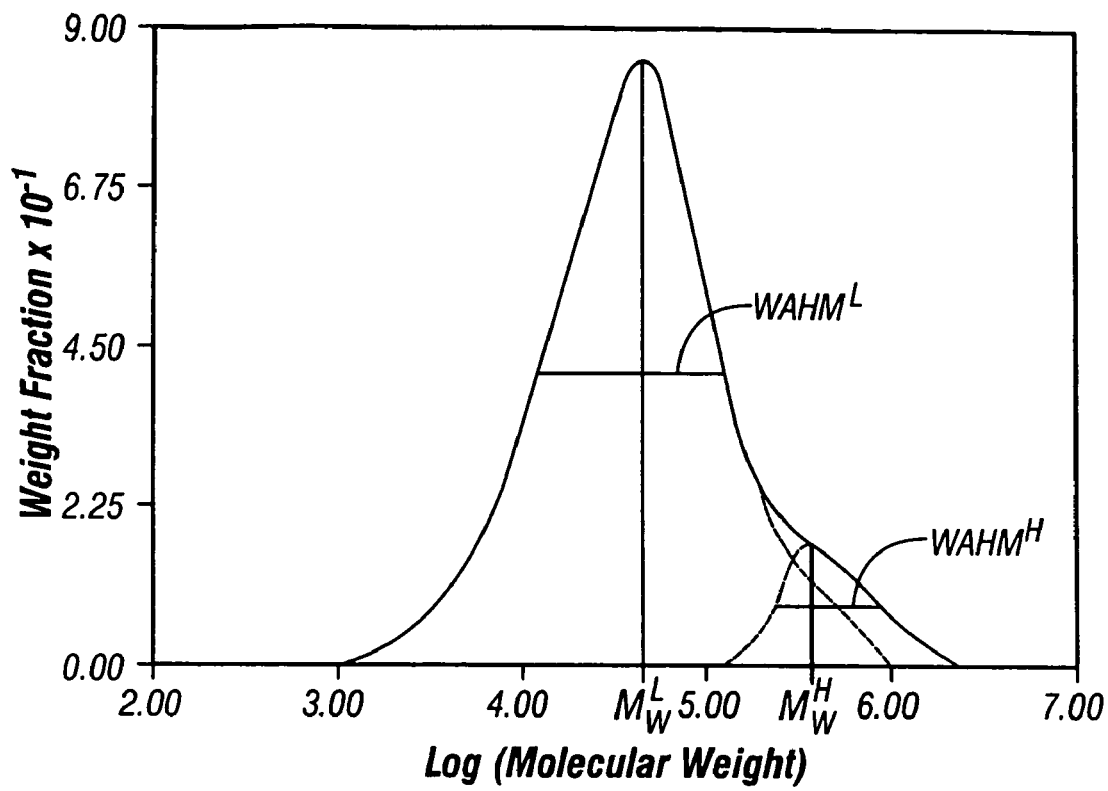
FIGS. 1A-1C are plots of molecular weight distribution for bimodal polymers in accordance with embodiments of the invention.
Figure 1B:
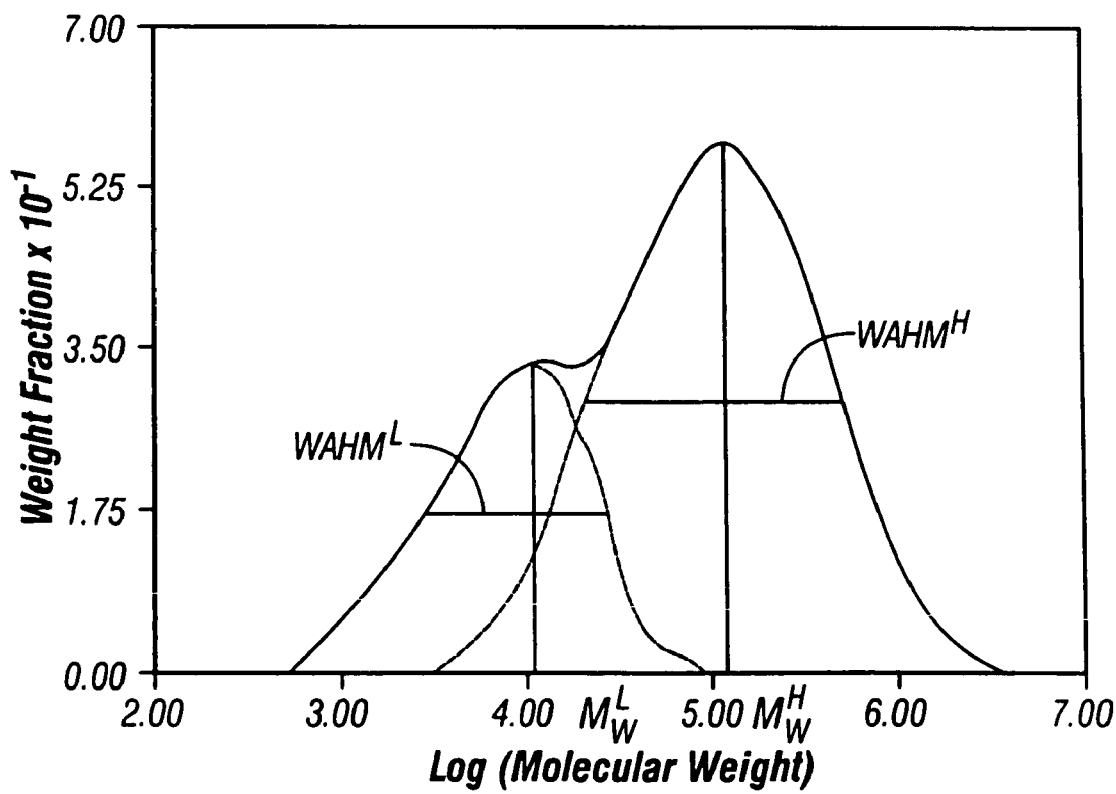
Figure 1C:
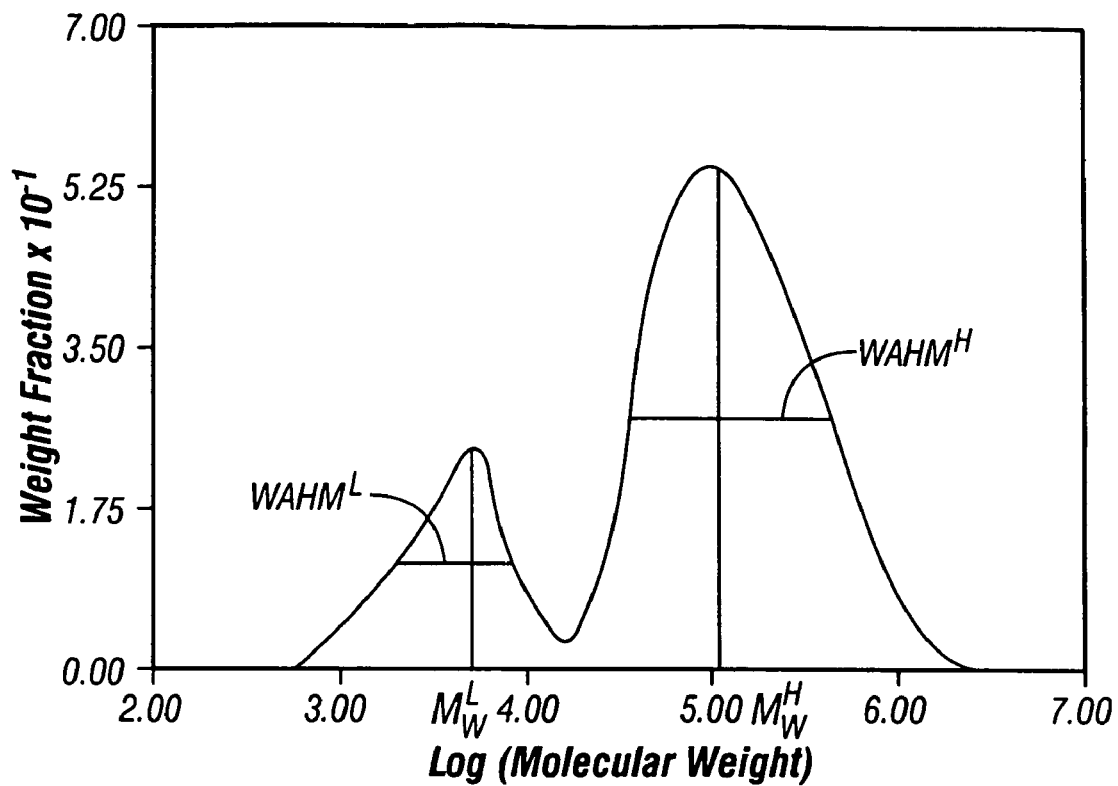

Embodiments of the invention provide a method of making water, oil, or gas pipes. The method includes selecting a polymer composition having a substantially single peak in an LTD curve and extruding the composition to form a pipe.

Embodiments of the invention provide a new polyethylene composition for making water, oil, or gas pipes and other products. The new composition comprises a low-molecular-weight (LMW) ethylene polymer component and a high-molecular-weight (HMW) ethylene polymer component. Preferably, the LMW component and the HMW component co-crystallize in the composition such that it exhibits a single or substantially single peak in an LTD curve. The ethylene polymer for the LMW and the HMW components can be either homopolyethylene or ethylene copolymer. Preferably, both components are an ethylene copolymer of the same or different composition (i.e., with the same or different comonomers). The bimodality of the molecular weight distribution of the new composition is due to the difference in the MWD of the LMW component and the HMW component. Preferably, the MWD of the LMW and HMW components individually is unimodal but is different and distinct from each other such that, when mixed, the resulting composition has an overall bimodal molecular weight distribution.

DEFINITIONS

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

The term "polymer" is used herein to indicate, a homopolymer, a copolymer, or a terpolymer. The term "polymer" as used herein includes interpolymers.

The term "LTD" used herein refers to the distribution of the lamella thickness, Lc, of a polymer. A LTD curve refers to a plot of the weight percentage having a particular lamellar thickness, Lc, as a function of the lamellar thickness, Lc. Both terms are explained in detail in the experimental section. Additional information can be found in U.S. Pat. No. 4,981,760, which is incorporated by reference herein in it entirety.

The term "bimodal" as used herein means that the MWD in a GPC curve exhibits two component polymers wherein one component polymer may even exist as a hump, shoulder or tail relative to the MWD of the other component polymer. A bimodal MWD can be deconvoluted into two components: LMW component and HMW component. After deconvolution, the peak width at half maxima (WAHM) and the average molecular weight ($M_w$) of each component can be obtained. Then the degree of separation ("DOS") between the two components can be calculated by the following equation:

$$DOS = \frac{\log(M_w^H) - \log(M_w^L)}{WAHM^H + WAHM^L}$$

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component. The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to abut 100, between about 100 to 500, or between about 500 to 1,000. It should be noted that DOS can be any number in the above range. In other embodiments, DOS exceeds 1,000.

In some embodiments the bimodality of the distributions is characterized by the weight fraction of the highest temperature peak in temperature rising elution fractionation (typically abbreviated as "TREF") data as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. The weight fraction corresponding to the highest temperature peak is referred to as the high-density fraction, since it contains little or no short chain branching. The remaining fraction is therefore referred to as the short chain branching (SCB) fraction, since it represents the fraction which contains nearly all the short-chain branching inherent to the polymer. This fraction is also the low density fraction.

The term "unimodal" as used herein in reference to the overall MWD of comparative examples or in reference to the MWD of a component polymer of the inventive composition means the MWD in a GPC curve does not substantially exhibit multiple component polymers (i.e. no humps, shoulders or tails exist or are substantially discernible in the GPC curve). In other words, the DOS is zero or substantially close to zero.

The term "distinct" as used herein in reference to the molecular weight distribution of the LMW component and the HWM component means there is no substantial overlapping of the two corresponding molecular weight distributions in the resulting GPC curve. That is, each molecular weight distribution is sufficiently narrow and their average molecular weights are sufficiently different that the MWD of both components substantially exhibits a baseline on its high molecular weight side as well as on its low molecular weight side. In other words, the DOS is at least 1, preferably at least 2, 4, 5, 7, 9, or 10.

The term "substantially singular peak" is used herein with reference to LTD curves to mean that a peak does not substantially exhibit two or more peaks. But a "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in an LTD curve into two or more components by various methods. In some embodiments a "substantially single peak in an LTD curve follows the equation:

$$\frac{P_H - P_L}{P_i} \times 100\% \leq 10\%$$

where $P_i$ is a point in the LTD curve having a value for the percent weight fraction between that of the highest weight fraction value, $P_H$, of the LTD trace and the lowest point, $P_L$, having an Lc value between the Lc value of $P_i$ and the Lc value of $P_H$ In some instances, this percent difference is less than about 8%, or less than about 7%. In some embodiments a substantially single peak has a difference of about 5% or less or about 2.5% or less. Of course in some embodiments, there is no point $P_L$ between $P_i$ and $P_H$ so the percent difference is zero.

The High Molecular Weight (HMW) Component

The HMW component has an $I_2$ melt index ranging from about 0.001 to about 1.0 gram per 10 minutes. In some embodiments the melt index ranges from about 0.01 to about 0.2 gram per 10 minutes. In some embodiments the melt index is less than or equal to 0.1 g/10 minutes, preferably it is characterized as having an $I_2$ melt index of from about 0.001 to about 0.1 g/10 minutes, more preferably from about 0.005 to about 0.05 g/10 minutes, most preferably from about 0.0085 to about 0.016. The flow index ($I_{21}$) can be in the range of about 0.20 to about 5.0 grams per 10 minutes, and is preferably in the range of about 0.25 to about 4 grams per 10 minutes. In some embodiments, the flow index ranges from about 0.25 to about 1.00. The melt flow ratio ($I_{21}/I_2$) of the polymer can be in the range of about 20 to about 65, and is preferably about 22 to about 50.

The $M_w$ of the HMW component is preferably in the range from about 100,000 to about 600,000 g/mole, more preferably in the range of from about 250,000 to about 500,000 g/mole, and most preferably in the range of from about 260,000 to about 450,000 g/mole. The $M_w/M_n$ of the HMW component is preferably relatively narrow. That is, preferably the $M_w/M_n$ of the HMW component is less than 8, more preferably less than or equal to 7.5, most preferably in the range of from about 3 to about 7, and especially in the range of from about 3.5 to about 6.5.

The HMW component typically has a lower density than the LMW component. The density of the HMW component is generally ranges from 0.890 to 0.945 g/cm³, preferably in the range of 0.910 to 0.940 g/cm³. In some embodiments the density ranges from about 0.915 to 0.935 g/cm³, and more preferably in the range of from about 0.920 to about 0.930 g/cm³.

The Low Molecular Weight (LMW) Component

The LMW component has an $I_2$ melt index that preferably ranges from about 40 to 2000 g/10 minutes, preferably it is characterized as having an $I_2$ melt index of from about 80 to about 1200 grams per 10 minutes, more preferably from about 400 to about 1100 g/10 minutes. In some embodiments, the melt index is in the range of about 500 to about 1000 grams per 10 minutes. The melt flow ratio ($I_{21}/I_2$) of this copolymer can be in the range of about 10 to about 65, and is preferably about 15 to about 60 or about 20 to about 50. In some embodiments, the melt flow ratio is about 22 to about 40.

The $M_w$ of the LMW component is preferably less than about 100,000. Preferably, the $M_w$ of the LMW component is in the range of about 10,000 to about 40,000, and more preferably in the range of about 15,000 to about 35,000. In some embodiments the $M_w$ of the LMW component ranges from about 25,000 to about 31,000. The $M_w/M_n$ of the LMW component is preferably less than 5, more preferably in the range of from about 1.5 to about 4.8 or from about 2 to about 4.6, and most preferably in the range of from about 3.2 to about 4.5. In some embodiments the $M_w/M_n$ ranges from about 2.5 to about 3.5 or from about from about 2.7 to about 3.1.

The LMW component is typically the higher density component. The density of the copolymer can be in the range of about 0.940 to about 0.978 g/cm³, and is preferably in the range of about 0.945 to about 0.970 g/cm³. In some embodiments, the density of the LMW component is about to 0.955 to about 0.965 g/cm³.

The Polymer Composition

The blend or final product can have a melt index ($I_5$) in the range of about 0.01 to about 2.0 grams per 10 minutes, and preferably has a melt index in the range of about 0.05 to about 1.0 grams per 10 minutes. In some embodiments, the $I_5$ melt index of the composition of about 0.1 to about 0.5 g/10 min., preferably in the range of from about 0.01 to about 0.5 g/10 minutes, more preferably from about 0.05 to about 0.45 g/10 minutes. The flow index ($I_{21}$) ranges from about 2 to about 50 grams per 10 minutes. In some embodiments, blend has a flow index ($I_{21}$) in the range of about 3 to about 20 grams per 10 minutes, preferably from about 4 to about 10 grams per 10 minutes. The melt flow ratio ($I_{21}/I_5$) of the blend can be in the range of about 10 to about 50, and is preferably in the range of about 15 to about 35, or in the range of about 20 to 32 grams per 10 minutes.

The molecular weight of the blend is, generally, in the range of about 200,000 to about 350,000. In some embodiments, the blend has a broad, bimodal molecular weight distribution. The broad molecular weight distribution is reflected in an $M_w/M_n$ ratio of about 18 to about 32, preferably about 20 to about 30. In other cases, the molecular weight distribution, $M_w/M_n$, of the composition is in some cases less than 20, more preferably less than or equal to 19, most preferably less than or equal to 18, especially less than or equal to 17.5 and most especially in the range of from about 10 to about 17.5. In some embodiments, the $M_w/M_n$ of the overall composition is less than 10, such as about 5, about 7, or about 9.

The polyethylene composition is also characterized as having an overall density of greater than or equal to 0.940 g/cm³, preferably in the range of from about 0.940 to about 0.960 g/cm³, more preferably from about 0.944 to about 0.955 g/cm³.

The weight ratio of copolymer prepared in the high molecular weight reactor to copolymer prepared in the low molecular weight reactor is referred to as the "split" of the polymer composition. In some embodiments, the split of the polymer compositions described herein can be in the range of about 0.8:1 to about 2.3:1, and is preferably in the range of about 0.9:1 to about 1.9:1. The optimum split is about 1.2:1 to about 1.5:1. In some embodiments the split is about 1.5:1 to about 2.0:1.

The split can also be essentially reflected by the weight percent of the HMW component and the LMW component in the blend composition. The HMW polymer component can be present in composition from about 0.5 wt. % to about 99.5%, based on the total weight of the HMW component and the LMW component. In some embodiments, the composition comprises from about 65 to about 35 weight percent, more preferably from about 55 to about 45 weight percent of the HMW ethylene component. Likewise, the polymer composition may comprise from about 0.5 wt. % to about 99.5 weight percent of the LMW component based on the total weight of the HMW component and the LMW component. In some embodiments, the novel composition comprises from about 35 to about 65 weight percent, preferably from about 45 to about 55 weight percent of a low molecular weight (LMW) high density ethylene homopolymer component.

Alternatively, the novel composition can be characterized as having $M_{v1}/M_{v2}$ ratio of less than or equal to 0.8, preferably less than or equal to 0.6, more preferably less than or equal to 0.4, where $M_{v1}$ is the viscosity average molecular weight of the LMW high density component and $M_{v2}$ is the viscosity average molecular weight of the HMW interpolymer component, as determined using ATREF-DV analysis as described in detail in WO 99/14271, the disclosure of which is incorporated herein by reference. WO 99/14271 also describes a suitable deconvolution technique for multicomponent polymer blend compositions.

Compared to past generations of industry standard ASTM PE-3408 materials, pipes made from polymers described herein have PENT values of at least 1000 hours. Some pipes have PENT values of greater than about 5000 hours, 6000 hours, 6500 hours, about 9000 hours 15,000 hours and 25,000 hours or more at 2.4 MPa. Pipes with a PENT value of 25,000 hours are 250 times more resistant to slow crack growth (SCG) when compared to the most stringent requirements for gas pipe in ASTM D2513. Some pipes made from the polyethylene described herein qualify as PE100 resins with extrapolated lifetimes of 100 years and validated by ISO 9080 for lifetimes of 250 years. Pipes with a diameter of 260 mm made from the compositions described herein can also have a pressure rating of at least about 12 bar at 0° C. when measured according to ISO 4437. Some pipes also meet the requirements for PE80 at 40° C., having an 8% higher pressure rating than type A PE 100 according to ISO 4427.

The compositions described herein show improved properties when evaluated for their resistance to rapid crack propagation according to the small scale S-4 test. Some compositions show zero or substantially zero rapid crack propagation of cracks at temperatures as low as −17° C. when pressurized at 10 MPa. In addition, zero or substantially zero rapid crack propagation is observed at 0° C. at about 25 MPa. In some embodiments, the novel composition is characterized by a low ductile to brittle transition temperature, $T_{db}$. $T_{db}$ may be measured by the S4 test and is sometimes referred to as the critical temperature for rapid crack propagation measurements. $T_{db}$ may also determined from critical strain energy release rate, $G_C$, measurements in the Charpy mode. Some novel compositions described herein have a $T_{db}$ of less than −20° C. Preferably, $T_{db}$ is about −25° C. or less, −30° C. or less, or about −40° C. or less. More preferably, $T_{db}$ is about −45° C. or less. In some embodiments, $T_{db}$ is about −50° C., about −60° C. or less, or about −80° C. or less. Some polymer compositions provide pipes having a critical temperature of about −17° C. or less when measured at 10 bar.

Catalyst Preparation

Typical transition metal catalyst systems, which can be used to prepare the blend, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; a chromium based catalyst system such as that described in U.S. Pat. No. 4,101,445; and a metallocene catalyst system such as those described in U.S. Pat. Nos. 4,937,299; 5,317,036; and 5,527,752. Catalyst systems, that use chromium or molybdenum oxides on silica-alumina supports, are also useful. Preferred catalyst systems for preparing the components for the blends of this invention are Ziegler-Natta catalyst systems and metallocene catalyst systems.

In some embodiments, preferred catalysts used in the process to make the compositions of the present invention are of the magnesium/titanium type. In particular, for the present gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. No. 6,187,866 and U.S. Pat. No. 5,290,745, the entire contents of both of which are herein incorporated by reference. Precipitated/crystallized catalyst systems such as those described in U.S. Pat. Nos. 6,511,935 and 6,248,831, the entire contents of both of which are herein incorporated by reference, may also be used.

The term "catalyst precursor" as used herein means a mixture comprising titanium and magnesium compounds and a Lewis Base electron donor. Preferably the catalyst precursor has the formula $Mg_d Ti(OR)_e X_f (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of about 0° C. to about 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains about 1 to about 20 moles of electron donor per mole of titanium compound and preferably about 1 to about 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, Magnesium and Titanium compounds may be impregnated into a porous support and dried to form a solid catalyst, it is preferred that the solution be converted into a solid catalyst via spray drying. Each of these methods thus forms a "supported catalyst precursor".

The spray dried catalyst product is then preferentially placed into mineral oil slurry. The viscosity of the hydrocarbon slurry diluent is sufficiently low so that the slurry can be conveniently pumped through the pre-activation apparatus and eventually into the polymerization reactor. The catalyst is fed using a slurry catalyst feeder. A progressive cavity pump such as a Moyno pump is typically used in commercial reaction systems while a dual piston syringe pump is typically used in pilot scale reaction systems, where the catalyst flows are $\leq 10$ cm$^3$/hour of slurry.

A cocatalyst, or activator, is also fed to the reactor to effect the polymerization. Complete activation by additional cocatalyst is required to achieve full activity. The complete activation normally occurs in the polymerization reactor although the techniques taught in EP1200483 may also be used.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula AlR$_a$X$_b$H$_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. Examples are diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1, and is preferably in the range of about 2:1 to about 5:1.

The hydrocarbyl aluminum cocatalyst can be represented by the formula R$_3$Al or R$_2$AlX wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see, for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Polymerization

The novel composition can be made by a variety of methods. For example, it may be made by blending or mixing a LMW polyethylene component and a HMW polymer component or by melt-blending the individually melted components. Alternatively, it may be made in situ in one or more polymerization reactors.

In a preferred dual reactor configuration of the process of the present invention, the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor, followed by further in reactor activation by the cocatalyst.

In the preferred dual reactor configuration, a relatively high molecular weight (low melt flow index) copolymer is prepared in the first reactor. Alternatively, the low molecular weight copolymer can be prepared in the first reactor and the high molecular weight copolymer can be prepared in the second reactor. For purposes of the present disclosure, the reactor in which the conditions are conducive to making a high molecular weight polymer is known as the "high molecular weight reactor". Alternatively, the reactor in which the conditions are conducive to making a low molecular weight polymer is known as the "low molecular weight reactor". Irrespective of which component is made first, the mixture of polymer and an active catalyst is preferably transferred from the first reactor to the second reactor via an interconnecting device using nitrogen or second reactor recycle gas as a transfer medium.

The polymerization in each reactor is conducted in the gas phase using a continuous fluidized bed process. In a typical fluidized bed reactor the bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein incorporated by reference.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952, the entire contents of which are herein incorporated by reference, is particularly useful.

The pressure is about the same in both the first and second reactors. Depending on the specific method used to transfer the mixture of polymer and contained catalyst from the first reactor to the second reactor, the second reactor pressure may be either higher than or somewhat lower than that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, i.e., the total pressure in either reactor, can be in the range of about 200 to about 500 psig (pounds per square inch gauge) and is preferably in the range of about 280 to about 450 psig. The ethylene partial pressure in the first reactor can be in the range of about 10 to about 150 psig, and is preferably in the range of about 20 to about 80 psig, and more preferably is in the range of about 25 to about 60 psig. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen.

Other inert hydrocarbons, such as an induced condensing agent e.g., isopentane, hexane also contribute to the overall pressure in the reactor according to their vapor pressure under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of about 0.5 to about 10 percent by weight, or more preferably about 0.8 to about 4 percent by weight, based on the weight of the copolymer.

The residence time of the mixture of reactants including gaseous and liquid reactants, catalyst, and resin in each fluidized bed can be in the range of about 1 to about 12 hours and is preferably in the range of about 1.5 to about 5 hours.

The reactors can be run in the condensing mode, if desired. The condensing mode is described in U.S. Pat. Nos. 4,543,399; 4,588,790; and 5,352,749, the entire contents of which are herein incorporated by reference.

While the polyethylene blend of subject invention is preferably produced in the gas phase by various low pressure processes. The blend can also be produced in the liquid phase in solutions or slurries by conventional techniques, again at low pressures. Low pressure processes are typically run at pressures below 1000 psi whereas high pressure processes are typically run at pressures above 15,000 psi.

In the High Molecular Weight Reactor:

Preferred operating temperatures vary depending on the density desired, i.e., lower temperatures for lower densities and higher temperatures for higher densities. Operating temperature will vary of from about 70° C. to about 110° C. The mole ratio of alpha-olefin to ethylene in this reactor can be in the range of from about 0.01:1 to about 0.8:1, and is preferably in the range of from about 0.02:1 to about 0.35:1. The mole ratio of hydrogen (if used) to ethylene in this reactor can be in the range of from about 0.001:1 to about 0.3:1, preferably of from about 0.01 to about 0.2:1.

In the Low Molecular Weight Reactor:

The operating temperature is generally in the range of from about 70° C. to about 110° C. The operating temperature is preferably varied with the desired density to avoid product stickiness in the reactor. The mole ratio of alpha-olefin to ethylene can be in the range of from about 0:0005 to about 0.6:1, preferably in the range of from about 0.001:1 to about 0.10:1. The mole ratio of hydrogen (optional) to ethylene can be in the range of from about 0.01:1 to about 3:1, and is preferably in the range of from about 0.5:1 to about 2.2:1.

Some blends are made in a single reactor using a mixed catalyst. In such mixed catalyst systems, the catalyst composition may include a combination of two or more Ziegler-Natta catalysts, two or more metallocene-based catalysts such as those described in U.S. Pat. Nos. 4,937,299; 5,317,036; and 5,527,752 the entire contents of which are incorporated herein by reference in their entirety, or a combination of Ziegler-Natta and metallocene catalysts. In some embodiments, a dual site metallocene catalyst may be used.

Fabricated Articles

The novel composition is particularly useful in fabricating transmission or distribution pipes for water and gases, especially pipes that substantially exceed a PE100 performance rating. In other words, the novel composition can be used to increase the service life of the pipe. Such pipes may be formed by extruding the compositions described herein by any convenient method. U.S. Pat. Nos. 6,204,349; 6,191,227; 5,908,679; 5,683,767; 5,417,561, and 5,290,498 disclose various pipes and methods of making the pipes which can be used in embodiments of the invention. As such, the disclosures of all of the preceding patents are incorporated by reference in their entirety.

Other useful fabricated articles can be made from the novel compositions disclosed herein. For example, molding operations can be used to form useful fabricated articles or parts from the compositions disclosed herein, including various injection molding processes (e.g., that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (e.g., that described in Modern Plastics Encyclopedia/89, Mid October 1988 Issue, Volume 65, Number 11, pp. 217-218, "Extrusion-Blow Molding" by Christopher Irwin, the disclosure of which is incorporated herein by reference), profile extrusion (i.e. for pipes), calandering, pultrusion, and the like. Rotomolded articles can also benefit from the novel compositions described herein. Rotomolding techniques are well known to those skilled in the art and include, for example, those described in Modern Plastics Encyclopedia/89, Mid October 1988 Issue, Volume 65, Number 11, pp. 296-301, "Rotational Molding" by R. L. Fair, the disclosure of which is incorporated herein by reference).

Fibers (e.g., staple fibers, melt blown fibers or spunbonded fibers (using, e.g., systems as disclosed in U.S. Pat. Nos. 4,340,563, 4,663,220, 4,668,566, or 4,322,027, all of which are incorporated herein by reference), and gel spun fibers (e.g., the system disclosed in U.S. Pat. No. 4,413,110, incorporated herein by reference)), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)) can also be made from the novel compositions disclosed herein.

Film and film structures can also be made from the novel compositions described herein by using conventional blown film fabrication techniques or other biaxial orientation processes such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), the disclosures of each of which are incorporated herein by reference, can also be used to make film structures from the novel compositions described herein. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by TAPPI Press (1992)) the disclosures of which are incorporated herein by reference.

The films may be monolayer or multilayer films. The film made from the novel compositions can also be coextruded with the other layer(s) or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, June 15-17 (1981), pp. 211-229, the disclosure of which is incorporated herein by reference. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), the disclosure of which is incorporated herein by reference, also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to about 7 layers.

EXAMPLES

The following examples are presented to illustrate various embodiments of the invention. They are not intended to be representative of all embodiments of the invention and should be not construed to limit the scope of the claimed invention as described here. All numbers described herein are approximate values and may vary within their accuracy ranges.

Test Methods

Unless otherwise noted, the values reported herein were determined according to the following test methods.

Density is measured in accordance with ASTM D-1505 from specimens cooled at 15° C./minute.

Melt index measurements are performed according to ASTM D-1238, Condition 190° C./2.16 kilogram (kg) and Condition 190° C./5 kg, and are known as $I_2$ and $I_5$, respectively. Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg and Condition 190° C./21.6 kg, and are known as $I_{10}$ and $I_{21}$, respectively. $I_{21}$ is referred to herein as the flow index. Melt flow ratio is the ratio of flow index ($I_{21}$) to melt index ($I_2$) unless otherwise specified. For example, in some instances the melt flow ratio may be expressed as $I_{21}/I_5$, especially for higher molecular weight polymers.

Flexural Modulus was measured according to ASTM D-790 Method 1 Procedure B. Tensile Strength At Yield was measured according to ASTM D-638. Both measurements were performed at 23° C. and are reported in megaPascal (MPa). Elongation At Break was measured according to ASTM D-638

The Pennsylvania Notch Test (PENT), a slow crack growth test, was performed following the procedure described by in ASTM F1473 at 80° C. and 2.4 Mpa. In the PENT method, a single edge notched test specimen is exposed to a constant load at a well-controlled temperature. The time to failure can be measured with a timer and the rate of failure can be measured with a microscope or a dial gauge. The notch depth is generally about 35% of the sample thickness. The width of the notch may vary from about 15 to about 25 mm and the side grooves can vary from about 0.5 to about 1.0 mm depending on the width of the specimen.

In the PENT test, a notch is made in the sample by pressing a fresh razor blade into the specimen at a speed of about 300 μ/min. At speeds of about 300 μ/min avoids notch tip damage and still provides a reasonably short notching time. At notching speeds of greater than about 525 μ/min, the failure time is significantly increased. Notching speeds for the side grooves is not particularly important. The apparatus should ensure that the notch and side grooves are coplanar.

During testing care should be taken to ensure that the specimen grips appropriately arranged. To that end, the grips should be aligned and centered with respect to the longitudinal axis of the specimen. During gripping the notch should not be activated by bending or twisting the specimen. An alignment jig may be used to aid in properly gripping the specimen to align the grips and avoid bending or twisting the specimen. In addition, the grips should have serrated faces to prevent slippage and the ends of the grips should be at least 10 mm from the notch.

The testing apparatus may be a direct loading device or a lever loading device. A 5:1 a lever on ratio has been found to be very convenient. The grips may be attached to the loading machine by tabs which have a universal action of that the applied to load is pure tension.

The applied stress is based on the unnotched cross-sectional area. The value of the applied stress depends on the testing temperature. The recommended value is that which produces brutal fracture as fast as possible. Higher stresses produced ductile failure and lower stresses along the testing time. For polyethylenes, the maximum stress for brittle failure, the applied stress should have the values of 5.6, 4.6, 4.2, and 2.4 MPa. at temperatures of 23, 42, 50, 80° C., respectively. In general, the stress for brittle failure by slow crack growth should be less than one half the yield point in that particular testing temperature.

The temperature should be controlled within ±0.5° C. It is not recommended that polyethylene be tested above 80° C. because significant morphological changes can occur during the test. Generally, depending on the test temperature, a 1° C. change in the past temperature will change the time to failure by about 10-15%.

Thermal Stability was measured according to ASTM D-3350.

Brittleness Temperature was measured according to ASTM D-746 Procedure A.

Izod Impact Strength, J/m was determined at 23° C. according to ASTM D-256.

MRS Rating was determined in accordance with ISO 9080.

Gel Permeation Chromatography (GPC) data were generated using either a Waters 150C/ALC, a Polymer Laboratories Model PL-210 or a Polymer Laboratories Model PL-220. The column and carousel compartments were operated at 140° C. The columns used were 3 Polymer Laboratories 10 micron Mixed-B columns. The samples were prepared at a concentration of 0.1 grams of polymer in 50 milliliters of 1,2,4 trichlorobenzene. The 1,2,4 trichlorobenzene used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute. Calibration of the GPC was performed with narrow molecular weight distribution polystyrene standards purchased from Polymer Laboratories. These polystyrene standard peak molecular weights were converted to polyethylene molecular weights using the following equation (as described in Williams and Ward, J. Polym. Sci., Polym. Let., 6, 621 (1968):

$$M_{polyethylene}=A\times(M_{polystyrene})^B$$

where M is the molecular weight, A has a value of 0.4316 and B is equal to 1.0. The molecular weight calculations were performed with the Viscotek TriSEC software. Weight average molecular weight, $M_w$, and number average molecular weight, $M_n$, was calculated in the usual manner according to the following formula:

$$Mj=(\Sigma w_i(M_i^j))^j;$$

where $w_i$ is the weight fraction of the molecules with molecular weight $M_i$ eluting from the GPC column in fraction i and j=1 when calculating $M_w$ and j=−1 when calculating $M_n$.

The GPC data can be deconvoluted to give the most probable fit for two or more molecular weight components. There are a number of deconvolution algorithms available both commercially and in the literature. These may lead to different answers depending upon the assumptions used. One method for decovoluting GPC data is described in U.S. application Ser. No. 10/222,273, filed Aug. 16, 2002, the entire disclosure of which is incorporated herein by reference.

Lamellar Thickness Distribution (LTD) data were obtained and analyzed in the following manner. Samples were cut directly from the fabricated polyethylene products. DSC samples were taken from the pipe wall, film or plaques used for PENT measurements. Samples can also be taken from the pellets to gain an insight into the effect of pelletizing condition on LTD. If the fabrication process did not yield a uniform cooling/solidification profile, samples should be taken from different parts of the product to reflect these differences. This may be important in extruded pipes if the pipe was cooled from the outside to the inside by cold water. The cooling rate therefore decreased from the outside to the inside of the pipe wall. To reflect these differences, at least three samples should be taken from the outside, middle and inside layer of the pipe wall.

About 10 mg of sample was analyzed by Differential Scanning Calorimetry (DSC) The DSC analysis was constructed using a heating rate of 10° C./min. Although the heating rate can be changed, it is recommended that the heating rate be fixed at 10° C./min for comparison purposes. To better compare the differences caused by molecular variables, the solidification history of the sample should be kept the same. This was done by measuring the DSC melting curve of the recrystallization sample. The recrystallization sample was made by melting the sample in the DSC sample holder at 190° C. and then cooling it down to 30° C. at the rate of 20° C./min. This eliminates artifacts in the DSC curve that might otherwise be observed due to previous fabrication processes.

A three step procedure was used. First, the LTD in products, such as pipes or film, is determined by scanning the sample from 30° C. to 190° C. at the heating rate of 10° C./min. The characteristics of the resultant LTD is associated with both the material variables and the processing condition. Keep the sample at 190 C for 1 minute to completely relax the molecular chains. Second, the sample is cooled at the cooling rate of 20° C./min from 190° C. to 30° C. to allow the sample to recrystallize under controlled conditions. The temperature was maintained at 30° C. for 1 minute. Third, the sample was heated at a rate of 10° C./min to determine LTD in the recrystallized sample. This LTD is used to investigate the effect of material variables by eliminating the fabrication factors.

First, the DSC melting peak is integrated. The melting temperature and the corresponding integrated partial area of the melting peak are recorded. The melting temperature is then used to calculate the lamella thickness, l, of polyethylene crystal according to the well-known Thomson-Gibbs equation from the melting point, $T_m$.

$$T_m = T_m^\circ \left(1 - \frac{2\sigma_e}{l \cdot \Delta h_m}\right) \quad (1)$$

where $T_m^\circ$ is the equilibrium melting point of an infinite crystal, $\sigma_e$ is the surface free energy of the basal plane, and $\Delta h_m$ is the enthalpy of fusion per unit volume In *Die Makromolekulare Chemie*, 1968, 113, 1-22, Illers and Hendus experimentally determined the constants in equation (1). The lamella thickness, $L_c$ (nm), then can be calculated from the melting point, $T_m$ (K).

$$L_c = \frac{0.62 - 414.2}{414.2 - T_m} \quad (2)$$

For a given melting temperature from the DSC melting peak the corresponding lamella thickness was obtained from equation (2). Lamellar thickness distributions are also discussed in Polymer vol. 38, issue 23 (1997) by Zhou, Hongi, and Wilkes, the disclosure of which is hereby incorporated by reference.

The integrated partial area of the melting peak is used to calculate the differentiated weight percent of the crystal for a given lamella thickness. The partial area, $\Delta H_i$, of a DSC melting peak is assumed to be proportional to the weight percent of the lamella crystal within this partial area. The differentiated weight percent, Wt %, of the lamellae at the thickness $L_{c,i}$ is therefore determined by equation (3).

$$wt\ \%\ (L_{c,i}) = \frac{d(\Delta H_i)/\Delta H_{total}}{d(L_c)} \quad (3)$$

The plot of the weight percent from the integrated partial area as a function of the lamella thickness gives the LTD curve. In addition, the total heat fusion of the melting peak can be used to determine the crystallinity. The detailed data analysis process is discussed in the following.

Analysis of the LTD curve obtained from the procedure described above can be analogized to the analysis of molecular weight distribution based on the weight ($M_w$) and number ($M_n$) average molecular weight, the thickness average, $L_t$, and number average, $L_n$, lamella thickness are therefore defined by equation (4) and (5).

$$L_t = \frac{\sum_{i=1}^{\infty} L_{c,i}^2 n_i}{\sum_{i=1}^{\infty} L_{c,i} n_i} = \sum_{i=1}^{\infty} L_{c,i} \frac{\Delta H_i}{\Delta H} \quad (4)$$

$$L_c = \frac{\sum_{i=1}^{\infty} L_{c,i} n_i}{\sum_{i=1}^{\infty} n_i} = \frac{1}{\sum_{i=1}^{\infty} \left(\frac{\Delta H_i}{\Delta H}\right)/L_{c,i}} \quad (5)$$

Similar to the polydispersity index (PDI=$M_w/M_n$) which gives information regarding the molecular weight distribution, the lamella dispersity index, LDI, is hence given by equation (6).

$$LDI = \frac{L_t}{L_n} \quad (6)$$

So LDI is a quantitative characteristic of the breadth of the LTD curve.

EXAMPLES

Examples 1-4

The polymer composition of Examples 1-4 were made by in-situ blending of polymers by contacting ethylene and 1-hexene comonomer in two fluidized bed reactors with a catalyst system comprising (i) a magnesium/titanium based precursor containing an electron donor and (ii) a hydrocarbaryl aluminum co-catalyst.

Preparation of Catalyst Precursor

A typical catalyst precursor preparation is described below. But one skilled in the art could readily vary the amounts employed depending on the amount of polymer required to be made.

The titanium trichloride catalyst component was prepared in a 1900 liter vessel equipped with pressure and temperature control, and a turbine agitator. A nitrogen atmosphere (<5 ppm $H_2O$) was maintained at all times.

Fourteen hundred eighty liters (1480 l) of anhydrous tetrahydrofuran (<40 ppm $H_2O$) were added to the vessel. The tetrahydrofuran was heated to a temperature of 50° C., and 1.7 kgs of granular magnesium metal (70.9 g. atoms) were added, followed by 27.2 kgs of titanium tetrachloride (137 mols). The magnesium metal had a particle size in the range of from 0.1 mm to 4 mm. The titanium tetrachloride was added over a period of about one-half hour.

The mixture was continuously agitated. The exotherm resulting from the addition of titanium tetrachloride caused the temperature of the mixture to rise to approximately 72° C. over a period of about three hours. The temperature was held at about 70° C. by heating for approximately another four hours. At the end of this time, 61.7 kgs of magnesium dichloride (540 mols) were added and heating was continued at 70° C. for another eight hours. The mixture was then filtered through a 100 micron filter to remove undissolved magnesium dichloride and any unreacted magnesium (<0.5%).

One hundred kilograms (100 kgs) of fumed silica (CAB-O-SIL® TS-610, manufactured by the Cabot Corporation) were added to the precursor solution over a period of about two hours. The mixture was stirred by means of a turbine agitator during this time and for several hours thereafter to thoroughly disperse the silica in the solution. The temperature of the mixture was held at 70° C. throughout this period and a dry nitrogen atmosphere was maintained at all times.

The resulting slurry was spray dried using an 8-foot diameter closed cycle spray dryer equipped with a Niro FS-15 rotary atomizer. The rotary atomizer was adjusted to give catalyst particles with a D50 on the order of 20-30 microns. D50 is controlled by adjusting the speed of the rotary atomizer. The scrubber section of the spray dryer was maintained at approximately −5° C.

Nitrogen gas was introduced into the spray dryer at an inlet temperature of 140 to 165° C. and was circulated at a rate of approximately 1700-1800 kg/hour. The catalyst slurry was fed to the spray dryer at a temperature of about 35° C. and a rate of 65-100 kg/hour, or sufficient to yield an outlet gas temperature in the range of 100-125° C. The atomization pressure was slightly above atmospheric.

The discrete catalyst precursor particles were then mixed with mineral oil under a nitrogen atmosphere in a 400 liter vessel equipped with a turbine agitator to form a slurry containing approximately 28 weight percent of the solid catalyst precursor.

Polymerization

The catalyst precursor slurry, the triethylaluminum cocatalyst, ethylene, alpha-olefin, and, optionally, hydrogen were continuously fed into the first reactor to make a HMW, lower density component was made. Product/catalyst mixture along with ethylene and, optionally, alpha-olefin and hydrogen, and cocatalyst are continuously transferred over to the second reactor via an inter-reactor transfer system such that little if any polymerization goes on during the transfer to the second reactor. In the second reactor additional cocatalyst was added and the unreacted catalyst in the product stream from the first reactor continued the reaction under the polymerization conditions in the second reactor. Little or no hexene was fed into the second reactor, but hexene is present due to carry over form the first reactor, thus a co-polymer of ethylene and hexene was made in the second reactor. The resin powder was conveyed out of the second reactor and combined with additives (antioxidants and acid neutralizers) and compounded in a twin screw mixer. The reaction conditions and properties of the products for Examples 1-4 are recorded in Table 1.

TABLE 1

| Reactor Conditions | Example 1 | | Example 2 | | Example 3 | | Example 4 | |
|---|---|---|---|---|---|---|---|---|
| | $1^{st}$ Reactor | $2^{nd}$ Reactor | $1^{st}$ Reactor | $2^{nd}$ Reactor | $1^{st}$ Reactor | $2^{nd}$ Reactor | $1^{st}$ Reactor | $2^{nd}$ Reactor |
| Temperature (° C.) | 80 | 110 | 80 | 110 | 80 | 110 | 80 | 110 |
| Pressure (psig) | 287 | 429 | 282 | 419 | 291 | 424 | 290 | 412 |
| C2 PP (psi) | 36.5 | 91.8 | 38.6 | 85.9 | 38.0 | 86.8 | 41.0 | 89.3 |
| H2/C2 | 0.019 | 1.80 | 0.028 | 1.80 | 0.026 | 1.79 | 0.025 | 1.81 |
| C4/C2 | 0.000 | 0.00 | 0.001 | 0.00 | 0.000 | 0.00 | 0.000 | 0.00 |
| C6/C2 | 0.047 | 0.007 | 0.056 | 0.007 | 0.050 | 0.003 | 0.063 | 0.004 |
| C6/C2 Flow Ratio | 0.027 | 0.000 | 0.023 | 0.004 | 0.026 | 0.000 | 0.024 | 0.000 |
| N2% | 74.9 | 35.0 | 76.7 | 37.5 | 76.5 | 36.8 | 75.1 | 34.1 |
| H2% | 0.230 | 37.2 | 0.359 | 35.7 | 0.323 | 35.6 | 0.332 | 37.9 |
| C2H4% | 12.1 | 20.7 | 13.0 | 19.8 | 12.4 | 19.8 | 13.5 | 21.0 |
| C2H6% | 0.840 | 3.20 | 1.254 | 4.46 | 1.131 | 4.27 | 0.845 | 4.25 |
| C4H8% | 0.000 | 0.01 | 0.013 | 0.00 | 0.000 | 0.00 | 0.000 | 0.00 |
| IC5% | 10.10 | 3.00 | 8.21 | 2.15 | 8.99 | 2.72 | 9.69 | 3.21 |
| C6H12% | 0.56 | 0.150 | 0.73 | 0.143 | 0.62 | 0.064 | 0.86 | 0.088 |
| TEALFlow (lbs/hr) | 15.2 | 7.1 | 10.5 | 4.8 | 8.8 | 3.7 | 11.7 | 5.1 |
| Production Rate (Mlbs/hr) | 46.0 | 35.0 | 49.0 | 36.2 | 46.2 | 31.7 | 49.5 | 33.6 |
| Catalyst Feed (lbs/hr) | 21.7 | — | 19.4 | — | 16.2 | — | 17.3 | — |
| C2 Feed (Mlbs/hr) | 44.8 | 35.0 | 47.9 | 36.1 | 45.2 | 31.7 | 48.2 | 33.6 |
| C4 Feed (Mlbs/hr) | — | — | — | — | — | — | — | — |
| C6 Feed (lbs/hr) | 1225 | 0.21 | 1118 | 158.85 | 1155 | 0.02 | 1143 | 0.00 |
| H2 Feed (lbs/hr) | 0.20 | 99.8 | 0.50 | 80.2 | 0.51 | 67.9 | 0.44 | 77.9 |
| N2 Feed (lbs/hr) | 671 | 55 | 332 | 24 | 761 | 24 | 832 | 131 |
| IC5 Feed (lbs/hr) | 775 | 1 | 617 | 0 | 472 | 0 | 812 | 0 |
| Vent Flow (lbs/hr) | 91 | 794 | 0 | 245 | 0 | 1 | 0 | 82 |
| Recov liq flow (lb/hr) | 196 | — | 123 | — | 383 | — | 116 | — |
| Bed Weight (Mlbs) | 105.0 | 167 | 94.7 | 183 | 95.1 | 196 | 95.2 | 201 |
| Upper FBD (lbs/ft$^3$) | 13.7 | 17.3 | 12.9 | 16.9 | 11.8 | 17.4 | 12.6 | 18.5 |
| Lower FBD (lbs/ft$^3$) | 16.4 | 19.1 | 15.2 | 20.0 | 15.5 | 21.5 | 15.6 | 21.4 |
| Bed Level (ft) | 35.5 | 45.0 | 35.6 | 47.1 | 38.3 | 47.4 | 36.2 | 47.3 |
| Residence Time(hr) | 2.3 | 2.1 | 1.9 | 2.1 | 2.1 | 2.5 | 1.9 | 2.4 |
| STY (lb/hr/ft$^3$) | 7.2 | 4.0 | 7.9 | 4.0 | 7.5 | 3.5 | 8.1 | 3.6 |
| SGV (ft/s) | 1.67 | 1.75 | 1.83 | 2.07 | 1.94 | 1.86 | 1.88 | 1.78 |
| % Condensing | 9.19 | 0.00 | 7.88 | 0.00 | 5.44 | 0.00 | 8.62 | 0.00 |
| Split | 0.568 | 0.432 | 0.576 | 0.424 | 0.593 | 0.407 | 0.595 | 0.405 |
| Split (Mass Balance) | 0.568 | 0.432 | 0.575 | 0.425 | 0.593 | 0.407 | 0.595 | 0.405 |
| Split (Ti Balance) | 0.598 | 0.402 | 0.629 | 0.371 | 0.585 | 0.415 | 0.606 | 0.394 |

TABLE 1-continued

| Resin Analysis | HMW polymer | Blend | HMW polymer | Blend | HMW polymer | Blend | HMW polymer | Blend |
|---|---|---|---|---|---|---|---|---|
| Ti (ppmw) | 3.31 | 1.98 | 2.96 | 1.86 | 2.81 | 1.65 | 2.72 | 1.65 |
| Al/Ti | 58.6 | 65.1 | 72.5 | 83.0 | 65.1 | 72.7 | 81.0 | 91.0 |
| Melt Index ($I_2$) | — | — | — | — | — | — | — | — |
| Melt Index ($I_5$) | — | 0.37 | — | 0.39 | — | 0.32 | — | 0.34 |
| Flow Index ($I_{21}$) | 0.45 | 9.49 | 0.41 | 9.25 | 0.40 | 7.32 | 0.43 | 7.54 |
| MFR ($I_2/I_{21}$) | — | — | — | — | — | — | — | — |
| MFR ($I_5/I_{21}$) | — | 25.7 | — | 24.0 | — | 22.8 | — | 22.2 |
| Density, g/cc | 0.9282 | 0.9482 | 0.9288 | 0.9486 | 0.9285 | 0.9479 | 0.9286 | 0.9484 |
| Bulk Density (lb/ft^3) | 23.7 | 28.7 | 22.4 | 26.8 | 23.5 | 28.3 | 22.1 | 26.7 |
| APS (in) | 0.023 | 0.022 | 0.025 | 0.027 | 0.026 | 0.026 | 0.028 | 0.029 |
| Fines | 3.4 | 2.8 | 2.9 | 2.6 | 6.6 | 7.2 | 2.1 | 2.8 |

*The examples also contain a resin additive package containing 1160 ppm Irganox ™ 1010 (a product and trademark of Ciba Geigy), and 1160 ppm Irgafoz 100, and 500 ppm calcium stearate.

The resins of Examples 1-4 were substantially reproduced and the performance of the resins in the PENT Test was determined at 2.4 MPa. The results are recorded in Table II.

TABLE II

| Sample | PENT, h | Comment |
|---|---|---|
| A | 5860.4 | |
| B | 5735.1 | |
| C | 8085.1 | |
| D | 8085.1 | |
| E | 8504.9 | Stopped, non-failure |
| F | 8010.2 | |
| G | 6233.5 | |
| H | 6180.8 | |
| I | 5405.4 | |
| J | 7905.8 | Stopped, non-failure |
| K | 9450.6 | |
| L | 8831.7 | |
| M | 9042.3 | |
| N | 9270.9 | |
| O | 9049.2 | Stopped, non-failure |
| P | 9049.2 | Stopped, non-failure |
| Q | 9049.5 | Stopped, non-failure |
| R | 9050.4 | Stopped, non-failure |
| S | 24900 | |

Example 5

In Example 5, a blend was prepared substantially the same procedure as described for Examples 1-4. The blend of Example 5 has the properties listed in Table III.

The resin of Example 5 has the following additional properties. It is classified as PE346564C according to ASTM D 3350 cell classification (the last number and letter are based on black resin). It meets the requirements of ASTM D2837 and the Plastics Pipe Institute TR-3 for the TR-4 listing of 1600 psi HDB at 23° C. and 1000 psi HDB at 60° C. compared to 800 psi HBD at 60° C. for standard PE3408.

The resin of Example 5 also meets the current requirements of ISO PE-100 standards for gas pipe (ISO 4437), water pipe (ISO 4427), and the industrial standard for PE100+ materials as described in "The PE100+ Association." In addition the resin of Example 5 offers and MRS rating at 20° C. for 100 years. This is twice the extrapolated lifetime of standard PE100. It has an MRS rating at 40° C. that is 8% higher than that of a type A PE100 according to ISO 4427. It also offers an MRS 6.3 at 60° C. of 11 years. It also meets Standard 14 and 61 of the National Science Foundation for potable water. Compared to past generations of industry standard ASTM PE-3408 materials, the resin has a PENT value that indicates it is at least sixty (60) times more resistant to slow crack growth, offers twice the extrapolated lifetime at standard operating pressures and is at least three (3) times more resistant to rapid crack propagation (RCP).

Figure 2:
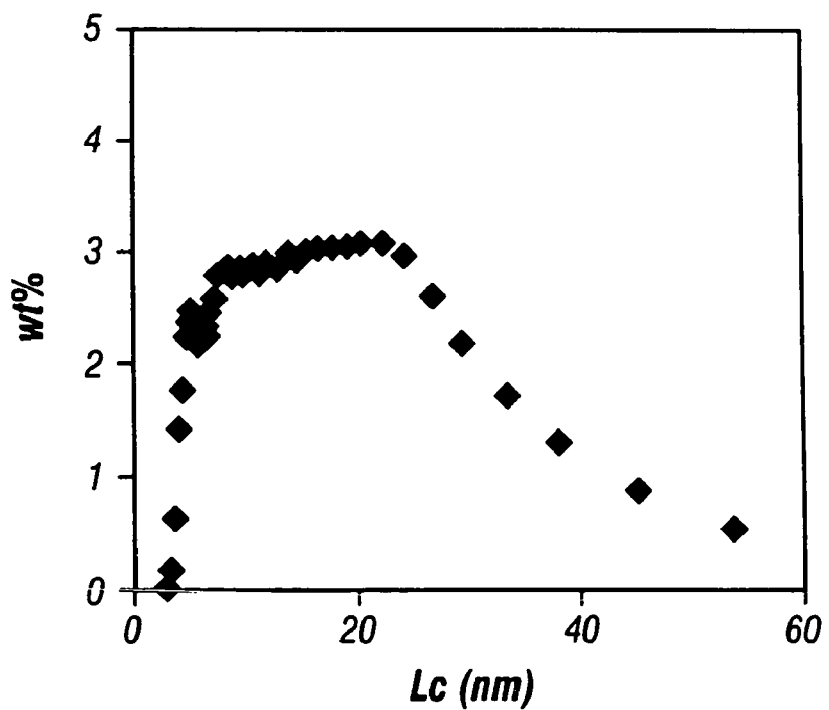
FIG. 2 is an LTD curve for a polymer composition exhibiting substantially a single peak in accordance with one embodiment of the invention.
Figure 3:
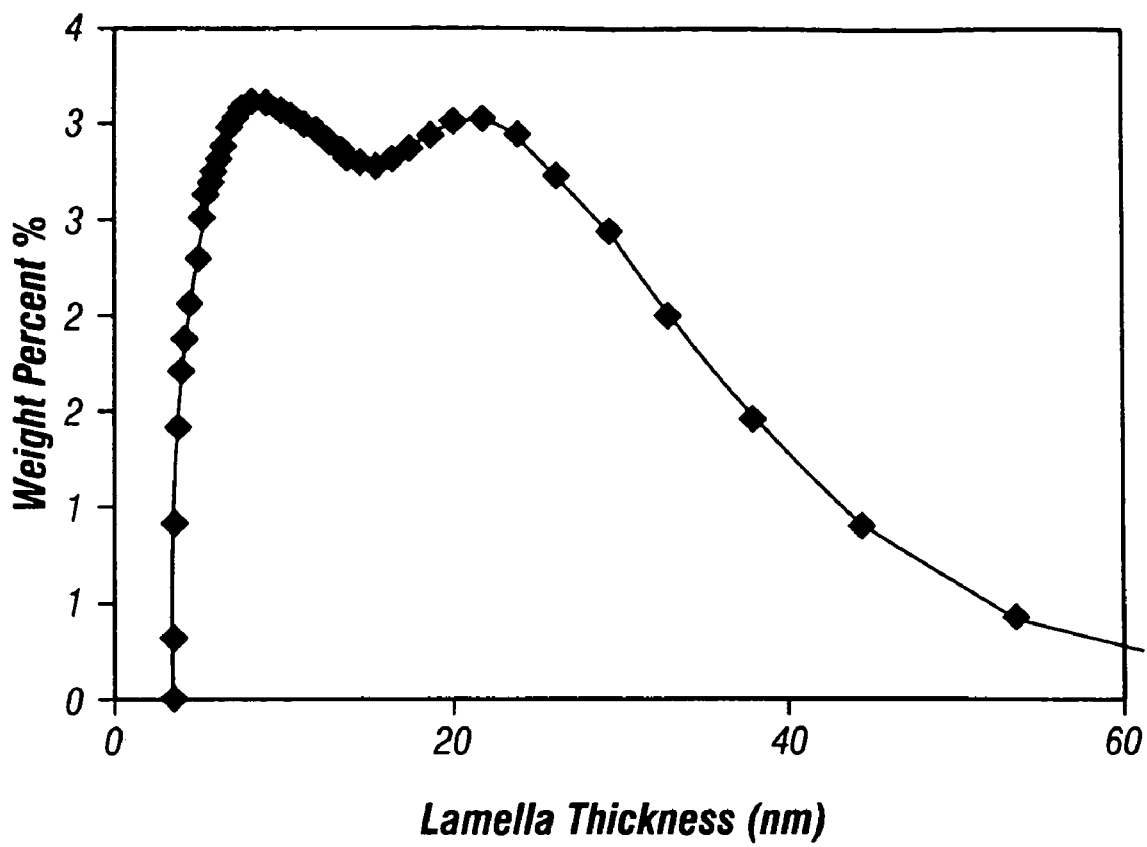
FIG. 3 is an LTD curve for a comparative polymer composition exhibiting two peaks.

The resin of Example 5 had a PENT result of about 6656 hours at about 3 MPa. This is equivalent to about 19968 hours at 2.4 MaP. Its LTD curve is shown in FIG. 2. As FIG. 3 indicates, the resin of Example 5 has a LTD curve that is substantially a single peak.

Comparative Examples 6-7

The resin of Comparative Example 6 is a blend of an LMW ethylene/1-hexene copolymer and an HMW ethylene/1-hexene copolymer and has the following properties: flow index ($I_{21}$): about 5-10; density: about 0.945-0.952 g/cm³; and molecular weight split: about 52-60. But as FIG. 3 indicates, Comparative Example 6 lacks the co-crystallization of Example 5 since it's LTD curve does not have a substantially single peak. Comparative Example 6 had a PENT value of about 56 hours at about 3 MPa.

Comparative Example 7 is commercially available from Exxon-Mobil Chemical Company of Houston, Tex. under the name Escorene™ 7755. This resin has a density of about 0.952 g/cm³, a flow index of about 9 g/10 minutes and a melt index ($I_2$) of about 0.055 g/10 minutes. Other properties are listed in Table III. Comparative Example 7 has a PENT value of about 45 hours at 3 MPa and does not have a substantially single peak in the LTD curve.

TABLE III

| Property | Example 5 | Comparative Example 6 | Comparative Example 7 |
|---|---|---|---|
| Density (g/cm³) | 0.947 | 0.9505 | |
| Flow Index ($I_{21}$) | 5 | 8.1 | 10 |
| Melt Index ($I_2$) | 0.05 | 0.093 | 0.08 |
| MFR ($I_{21}/I_2$) | 100 | 87 | 164 |
| PENT (@ 3 MPa, hrs) | >6500 | 56.1 | 45 |
| PENT (@ 2.4 MPa, hrs) | >19500 | 168.3 | |
| Flexural Modulus MPa 23 C. | 1200 | | |
| Tensile Strength At Yield MPa 23 C. | 25 | | |
| Elongation At Break, % | 750 | | |
| Thermal Stability, ° C. | >220 | | |
| Brittleness Temperature, ° C. | <−75 | | |
| Izod Impact Strength, J/m 23° C. | 500 | | |
| ISO MRS Rating | MRS-10 | | |

As demonstrated above, embodiments of the invention provide a new polyethylene composition which is useful for making water and gas pipes and various other articles of manufacture. The new composition has one or more of the following advantages. First, the new composition has better durability. In some instances, exceptional durability is achieved by certain compositions. However, the improved durability is not achieved at the expense of toughness. Certain compositions exhibit good toughness and durability. As such, articles made from the new compositions should have longer service lives. Because the new composition comprises at least two components, desired properties of the overall composition may be obtained by adjusting the characteristics of each component, such as MWD, average molecular weight, density, comonomer distribution, etc. Therefore, it is possible to design a desired composition by molecular engineering. Other characteristics and additional advantages are apparent to those skilled in the art.

While the invention has been described with respect to a limited number of embodiments, the specific features of one embodiment should not be attributed to other embodiments of the invention. No single embodiment is representative of all aspects of the inventions. Moreover, variations and modifications therefrom exist. For example, the polyethylene composition may comprise a third component, either ethylene homopolymer or copolymer, which makes the composition tri-modal in the overall molecular weight distribution. Similarly, a fourth, fifth, or sixth component may also be added to adjust the physical properties of the composition. Various additives may also be used to further enhance one or more properties. In other embodiments, the composition consists of or consists essentially of the LMW component and the HMW component described herein. In some embodiments, the composition is substantially free of any additive not specifically enumerated herein. In certain embodiments, the composition is substantially free of a nucleating agent. Cross-linking by physical or chemical methods may be another way to modify the composition. Some embodiments of the method described herein consist of or consist essentially of the enumerated steps. In addition pipes are extruded from any of the compositions described herein. The appended claims intend to cover all such variations and modifications as falling within the scope of the invention.

What is claimed is:

1. A polymer composition, comprising:
   a) a low molecular weight polyethylene component, having a density of 0.940 to 0.978 g/cm$^3$, a melt index ($I_2$) of >80 to about 1200 g/10 min, a molecular weight ($M_w$) from about 10,000 to 40,000 g/mole, a molecular weight distribution ($M_w/M_n$) of less than 5, and a melt flow ratio ($I_{21}/I_2$) of from about 10 to about 65; and co-crystallized with
   b) a high molecular weight polyethylene component, having a density of 0.920 to 0.935 g/cm$^3$, a melt flow index ($I_{21}$) of from about 1.0 to about 5.0 grams per 10 minutes, a molecular weight ($M_w$) ranging from about 100,000 to about 600,000 g/mole, a molecular weight distribution ($M_w/M_n$) of less than 8, and a melt flow ratio ($I_{21}/I_2$) of from about 20 to about 65, wherein the polymer composition has a single peak in a lamellar thickness distribution curve and a pipe made from the polymer composition has a PENT value according to ASTM F1473 of greater than 9000 hours at 80° C. and 2.4 MPa and a rapid crack propagation (RCP)S4-value of −5 degrees C. or lower at 10 MPa, and wherein the polymer composition has a density measured according to ASTM D-1505 of 0.940 g/cm$^3$ or greater and a molecular weight ranging from 200,000 to 350,000 g/mol, a melt index ($I_5$) of from about 0.01 to about 2.0 g/10 m, a flow index ($I_{21}$) of from about 2 to about 50 g/10 m, a melt flow ratio ($I_{21}/I_5$) of from about 10 to about 50, a molecular weight distribution ($M_w/M_n$) ranging from about 18 to about 32, where $I_5$ is determined according to ASTM D-1238, Condition 190° C./5 kg and $I_{21}$ is determined according to ASTM D-1238, Condition 190° C./21.6 kg.

2. The composition of claim 1, wherein the high molecular weight polyethylene component includes a comonomer selected from the group consisting of $C_4$ to $C_{10}$ olefins.

3. The composition of claim 2, wherein the comonomer content ranges from greater than 0 to about 40%.

4. The composition of claim 1, wherein the low molecular weight polyethylene component includes a comonomer selected from the group consisting of $C_4$ to $C_{10}$ olefins.

5. The composition of claim 4, wherein comonomer content ranges from greater than 0 to about 30%.

6. The composition of claim 1, wherein the polymer composition is bimodal.

7. The composition of claim 1, wherein the high molecular weight polyethylene component comprises from about 48 to about 67 percent by weight of the combined weight of the high molecular weight component and the low molecular weight polyethylene component in the polymer composition.

8. The composition of claim 1, wherein the low molecular weight component comprises from about 33 to about 52 percent by weight of the combined weight of the high molecular weight component and the low molecular weight polyethylene component in the polymer composition.

9. The composition of claim 1, wherein the composition has
   1) a melt flow index ($I_5$) of from about 0.2 to about 1.5 g/10 m;
   2) a molecular weight distribution, $M_w/M_n$, of from about 15 to about 40; and
   wherein the high molecular weight polyethylene component comprises from about 30 to about 70 wt. percent of the composition; has a melt flow index ($I_2$) of from about 0.01 to about 0.2 g/10 min; and a melt flow ratio ($I_{21}/I_2$) of from about 20 to about 65; and
   wherein the low molecular weight polyethylene component comprises from about 30 to about 70 wt. percent of the composition; has a melt index ($I_2$) of from about 40 to about 2000 g/10 min; and has a melt flow ratio ($I_{21}/I_2$) of from about 10 to about 65.

* * * * *